(12) United States Patent
Tsuchiya

(10) Patent No.: US 11,438,469 B2
(45) Date of Patent: Sep. 6, 2022

(54) WIRELESS TERMINAL, MANAGEMENT SERVER AND INTENTION INTERPRETATION SERVER

(71) Applicant: CANON KABUSHIKI KAISHA, Tokyo (JP)

(72) Inventor: Masato Tsuchiya, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/901,364

(22) Filed: Jun. 15, 2020

(65) Prior Publication Data
US 2020/0314264 A1 Oct. 1, 2020

Related U.S. Application Data

(63) Continuation of application No. PCT/JP2018/042099, filed on Nov. 14, 2018.

(30) Foreign Application Priority Data

Dec. 19, 2017 (JP) .............................. JP2017-242878

(51) Int. Cl.
*H04N 1/00* (2006.01)
*G10L 15/18* (2013.01)
(Continued)

(52) U.S. Cl.
CPC ..... *H04N 1/00403* (2013.01); *G10L 15/1815* (2013.01); *G10L 15/22* (2013.01);
(Continued)

(58) Field of Classification Search
USPC .............. 358/1.1–3.29, 1.11–1.18, 400–434; 382/100, 155–160; 704/1–10, 200–277;
(Continued)

(56) References Cited

U.S. PATENT DOCUMENTS 8,593,501 B1* 11/2013 Kjeldaas .................. H04N 7/15
348/14.01
9,824,188 B2* 11/2017 Brown .................... G10L 15/08
(Continued)

FOREIGN PATENT DOCUMENTS

| JP | 2003-051887 A | 2/2003 |
| JP | 2004151562 A | 5/2004 |

(Continued)

OTHER PUBLICATIONS

Russian Office Action dated Dec. 7, 2020 in counterpart Russian Patent Appln. No. 2020123539.
(Continued)

*Primary Examiner* — Marcellus J Augustin
(74) *Attorney, Agent, or Firm* — Venable LLP

(57) ABSTRACT

A wireless terminal according to an embodiment accepts a user input with a speech or a text, notifies a server of the accepted user input, and allows a user and the server to interact with each other by obtaining a question related to the user input from the server and presenting the obtained question to the user. Also, the wireless terminal receives, from the server, a list of one or more image forming apparatuses that match an intention of the user that is interpreted by the server based on the interaction through the interaction and displays the received list.

27 Claims, 9 Drawing Sheets

(51) Int. Cl.
  *G10L 15/22* (2006.01)
  *G10L 15/30* (2013.01)
(52) U.S. Cl.
  CPC ......... *G10L 15/30* (2013.01); *H04N 1/00244* (2013.01); *H04N 1/00411* (2013.01); *G10L 2015/223* (2013.01)
(58) Field of Classification Search
  USPC .................................................. 709/201–249
  See application file for complete search history.

(56) References Cited

U.S. PATENT DOCUMENTS

| | | | | |
|---|---|---|---|---|
| 10,964,325 | B2* | 3/2021 | Gilbert | G06F 3/167 |
| 2011/0235085 | A1* | 9/2011 | Jazayeri | G06F 3/1206 |
| | | | | 358/1.14 |
| 2014/0253326 | A1* | 9/2014 | Cho | G08B 7/066 |
| | | | | 340/539.13 |
| 2018/0102914 | A1* | 4/2018 | Kawachi | G10L 15/22 |
| 2019/0251126 | A1* | 8/2019 | Joseph | G06F 16/3329 |
| 2019/0257691 | A1* | 8/2019 | Jeong | B41J 3/407 |
| 2019/0258385 | A1* | 8/2019 | Kim | G06F 3/12 |

FOREIGN PATENT DOCUMENTS

| | | |
|---|---|---|
| JP | 2012-248161 A | 12/2012 |
| JP | 2013-153301 A | 8/2013 |
| JP | 2014203320 A | 10/2014 |
| JP | 2016-212761 A | 12/2016 |
| JP | 2017016683 A | 1/2017 |
| JP | 2017-107529 A | 6/2017 |
| RU | 2346406 C2 | 2/2009 |
| RU | 2589856 C2 | 7/2016 |

OTHER PUBLICATIONS

International Search Report issued in corresponding parent International Application No. PCT/JP2018/042099, dated Jan. 22, 2019.
Korean Office Action dated Aug. 24, 2021 in counterpart Korean Patent Appln. No. 10-2020-7019870.
Japanese Office Action dated Apr. 1, 2022 in counterpart Japanese Patent Appln. No. 2017-242878.

* cited by examiner

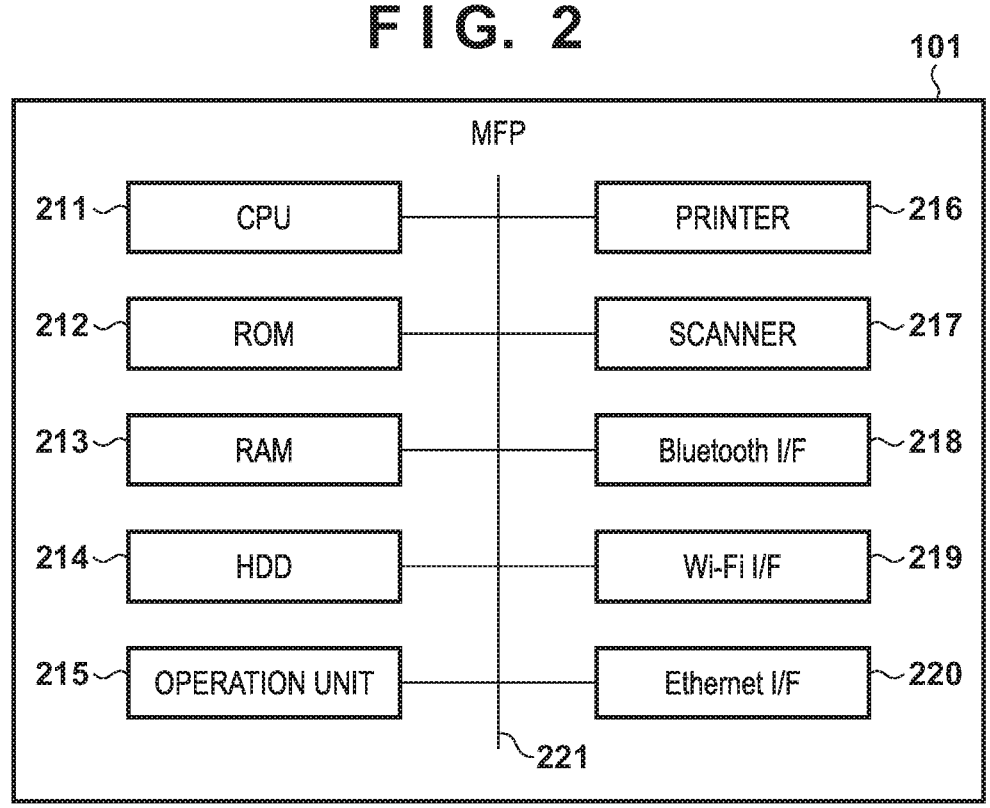
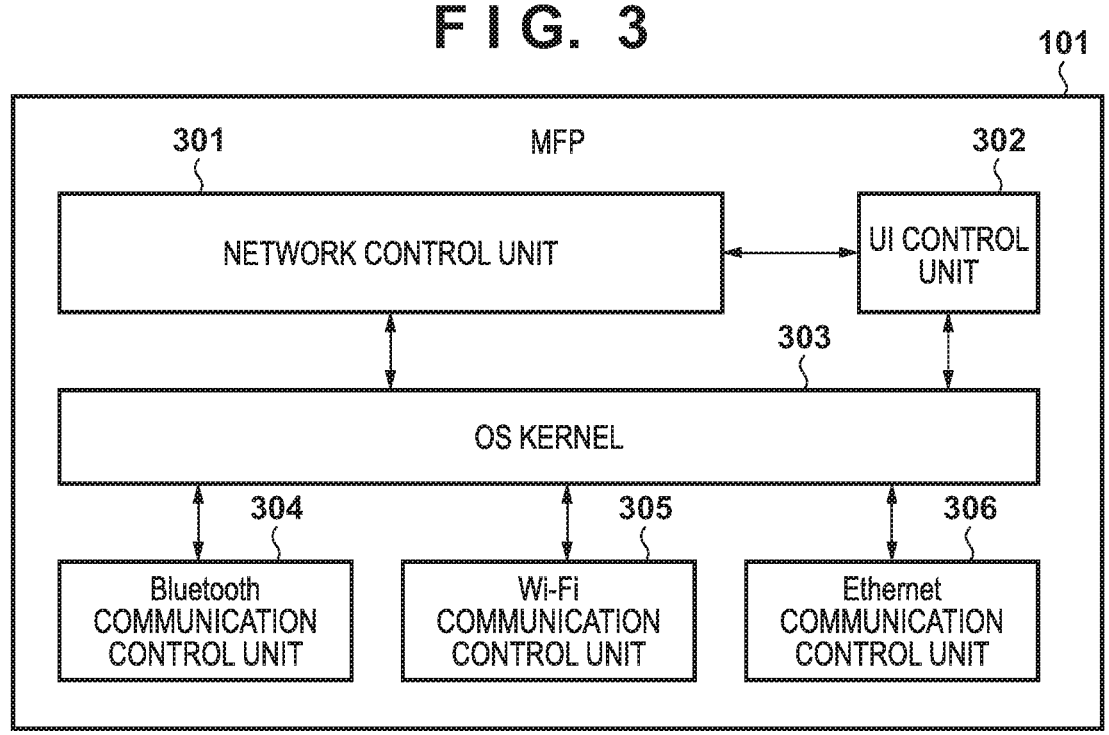

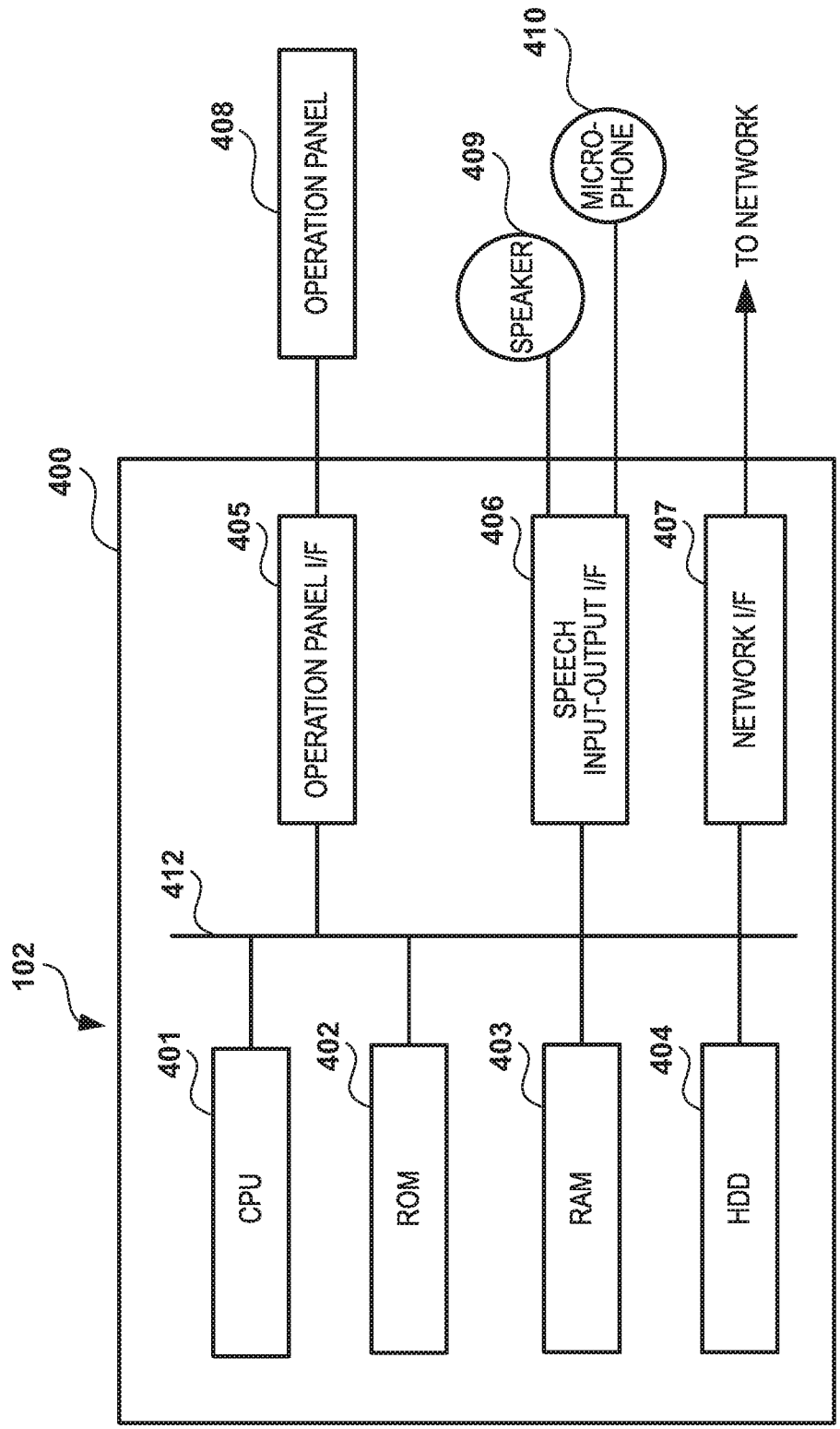

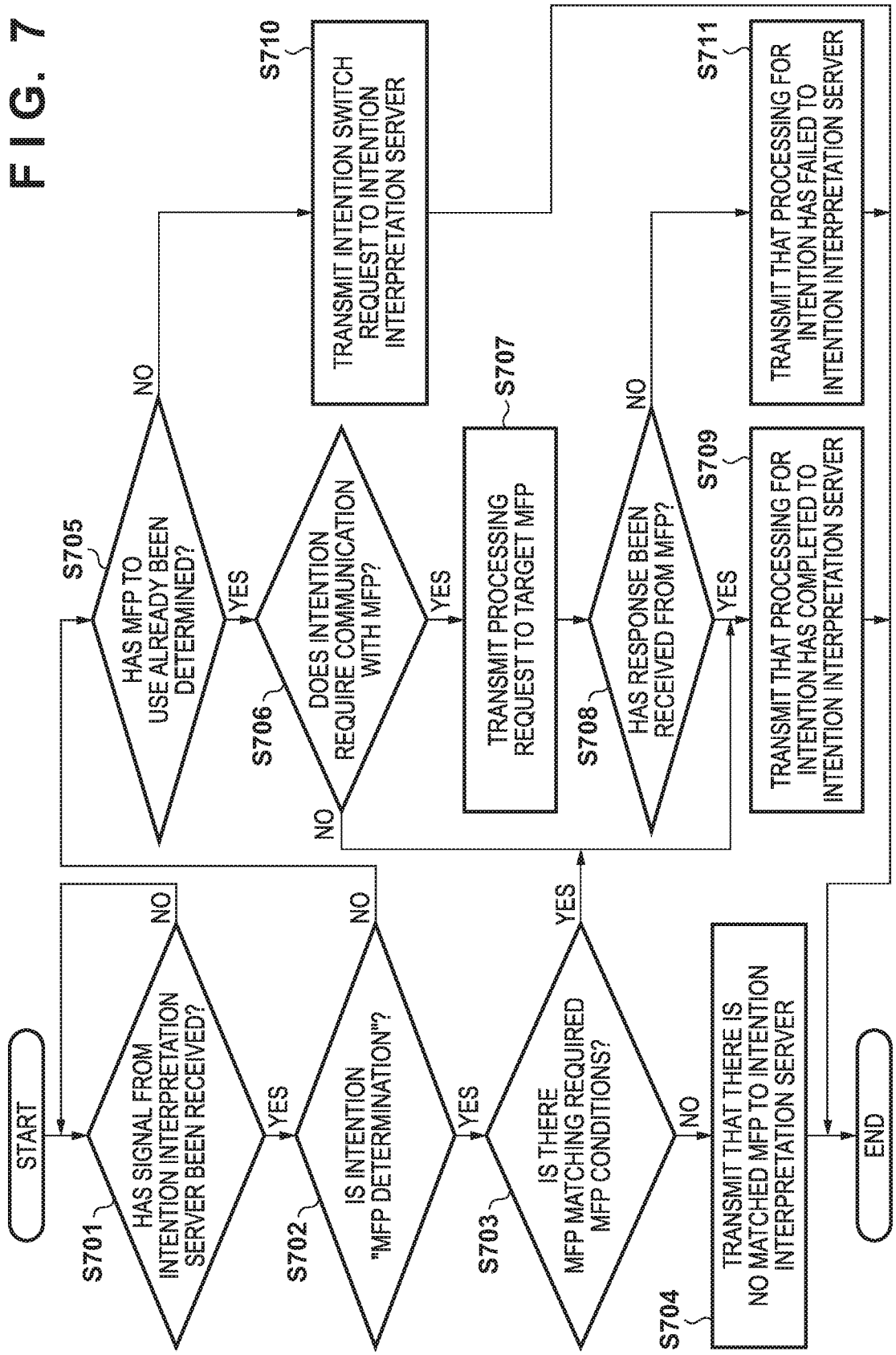

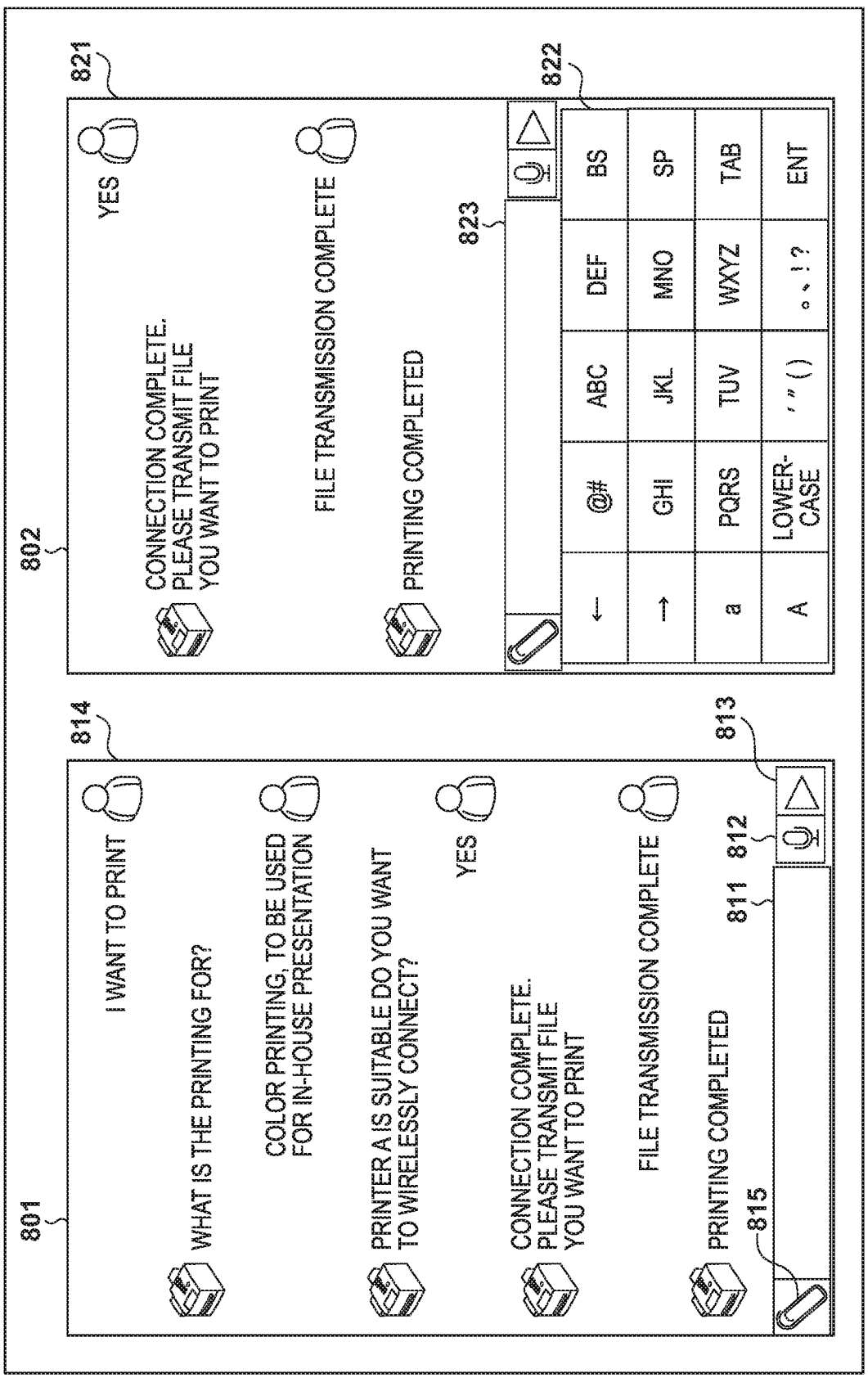

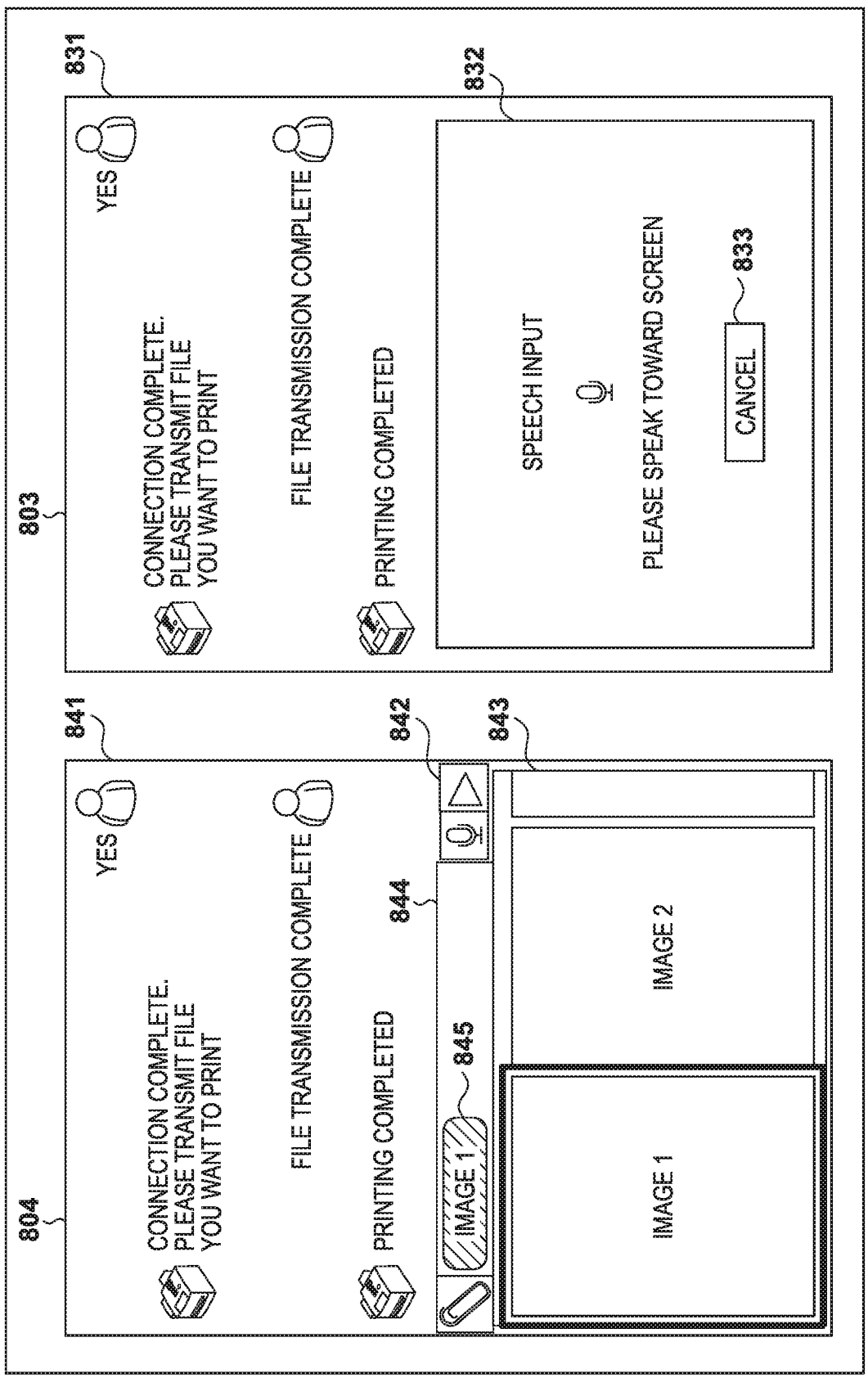

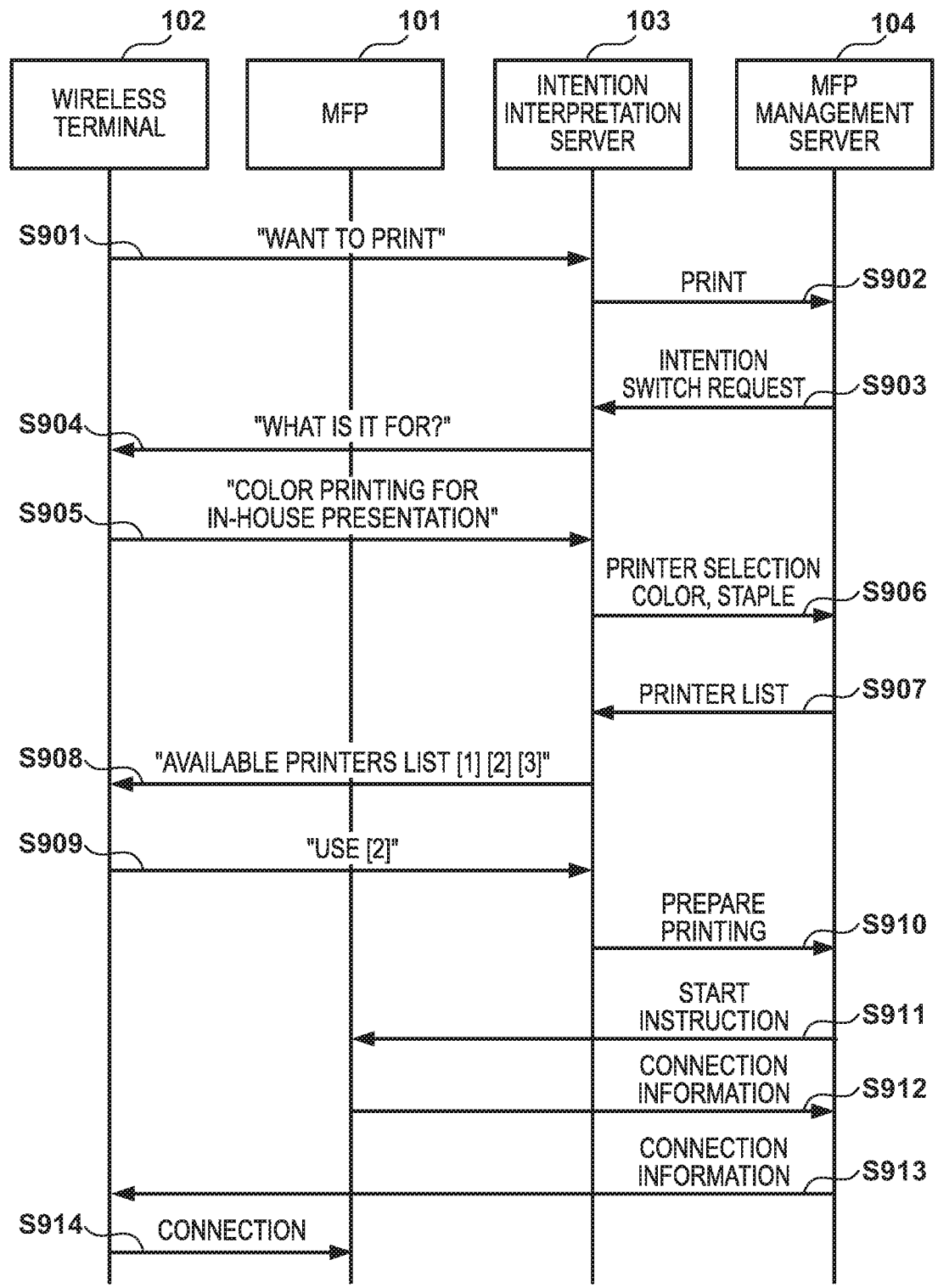

WIRELESS TERMINAL, MANAGEMENT SERVER AND INTENTION INTERPRETATION SERVER

CROSS-REFERENCE TO RELATED APPLICATIONS

This application is a Continuation of International Patent Application No. PCT/JP2018/042099, filed Nov. 14, 2018, which claims the benefit of Japanese Patent Application No. 2017-242878, filed Dec. 19, 2017, both of which are hereby incorporated by reference herein in their entirety.

BACKGROUND OF THE INVENTION

Field of the Invention

The present invention relates to a wireless terminal, a management server and an intention interpretation server.

Background Art

The field of artificial intelligence-related research and development in recent years is in the very middle of its infancy stage, and devices covering from small electronic devices, such as smartphones and electrical appliances, to large devices, such as vehicles and houses, have begun to be equipped with functions that utilize artificial intelligence. Above all, technologies associated with interactive user interfaces using speech recognition and natural language processing have already been sufficiently accumulated to a practical level. It can be said that platforms for engineers involved in front-end development to equip their products with interactive user interface functionalities is complete, and the difficulties in the development have been considerably reduced.

With an interactive user interface, an electronic device is operated in the form of "interaction" between a person and a computer using speech or text input. In the case of a voice command function, which have already been in practical use, a response is only given to a specific keyword, whereas an interactive user interface enables a person to operate an electronic device while making the person feel as if he is interacting with the device. A problem in the interactive user interfaces using speech recognition and natural language processing lies in how to read the intention of a user at the present moment from the content of speech or text input made by the user. Patent Document 1 proposes a method of introducing a concept of hands-free context to interpret the intention of a user.

CITATION LIST

Patent Literature

PTL1: Japanese Patent Laid-Open No. 2017-16683

SUMMARY OF THE INVENTION

Meanwhile, image forming apparatuses, such as an MFP (Multifunctional peripheral), require a user to perform more complex operations, as functionalities provided become more and more diversified and complex. Depending on the service desired, it is very complex and bothersome, in some cases, for the user to set conditions or the like while browsing the user interface of the MFP. Furthermore, when the MFP is accessed from a mobile terminal or the like, it is difficult for a general user to understand how to make complex settings of Wireless Direct, for example, on the user interface. In addition, some users do not sufficiently comprehend the functions themselves that the MFP or the like has. Thus, there is a demand for a user interface that readily interprets the intention of a user and present an appropriate device, function, or the like to the user.

The present invention has been made in view of at least one of the foregoing problems, and aims to provide a mechanism that interactively obtains the intention of a user and presents a device, a function, or the like that is suitable for the intention of the user, without requiring the user to perform a complex operation.

For example, the present invention is a wireless terminal capable of communicating with an image forming apparatus and a server, the wireless terminal comprising: an interaction unit that accepts user input with a speech or a text, notifies the server of the accepted user input, and allows a user and the server to interact with each other by obtaining a question related to the user input from the server and presenting the obtained question to the user; a receiving unit that receives, from the server, a list of one or more image forming apparatuses that match an intention of the user that is interpreted by the server based on the interaction through the interaction unit; and a display unit that displays the list received by the receiving unit.

Also, the present invention is a management server capable of communicating with an intention interpretation server that interprets an intention of a user of a wireless terminal in accordance with user input made by the user, and one or more image forming apparatuses, the management server comprising: a printer database holding a printer information table that defines a user and one or more available image forming apparatuses in association with each other, and a printer capability information table that defines capability information regarding the image forming apparatuses; a receiving unit that receives the intention of the user interpreted by the intention interpretation server; and a providing unit that generates a list of one or more image forming apparatuses that match the intention received by the receiving unit, with reference to the printer database, and providing the generated list.

Also, the present invention is an intention interpretation server capable of communicating with a management server and a wireless terminal, the intention interpretation server comprising: a receiving unit that receives user input with a speech or a text from the wireless terminal; a speech recognition engine that performs speech recognition in a case where the user input received by the receiving unit is a speech; a language processing engine that performs language processing on the user input that has undergone speech recognition by the speech recognition engine, or the user input with a text; an intention database holding a plurality of intentions and one or more parameters for each of the intentions, in association with each other; and an intention interpretation unit for interpreting an intention of a user in accordance with the user input that has undergone language processing by the language processing engine and information held by the intention database, and presenting an additional question on the wireless terminal in a case where the intention of the user cannot be interpreted.

Further features of the present invention will become apparent from the following description of exemplary embodiments with reference to the attached drawings.

BRIEF DESCRIPTION OF THE DRAWINGS

The attached drawings are included in the specification and constitute a part of the specification, illustrate embodiments of the present invention, and are used to describe the principle of the present invention together with the description of the specification.

FIG. 2 is a diagram showing a hardware configuration of an MFP according to an embodiment.

FIG. 3 is a diagram showing a software configuration of the MFP according to an embodiment.

FIG. 4 is a diagram showing a hardware configuration of a wireless terminal according to an embodiment.

FIG. 7 is a flowchart of an MFP management server according to an embodiment.

FIG. 8A is a diagram showing transition of a user interface of the mobile terminal according to an embodiment.

FIG. 8B is a diagram showing transition of the user interface of the mobile terminal according to an embodiment.

FIG. 9 is a sequence chart applied to printer selection according to an embodiment.

DESCRIPTION OF THE EMBODIMENTS

Hereinafter, embodiments of the present invention will be described. Individual embodiments described below will help understanding of various concepts, including superordinate concepts, medium concepts, and subordinate concepts, of the present invention. The technical scope of the present invention is established by the claims, and is not limited by the following embodiments.

First Embodiment

System Configuration

Figure 1:
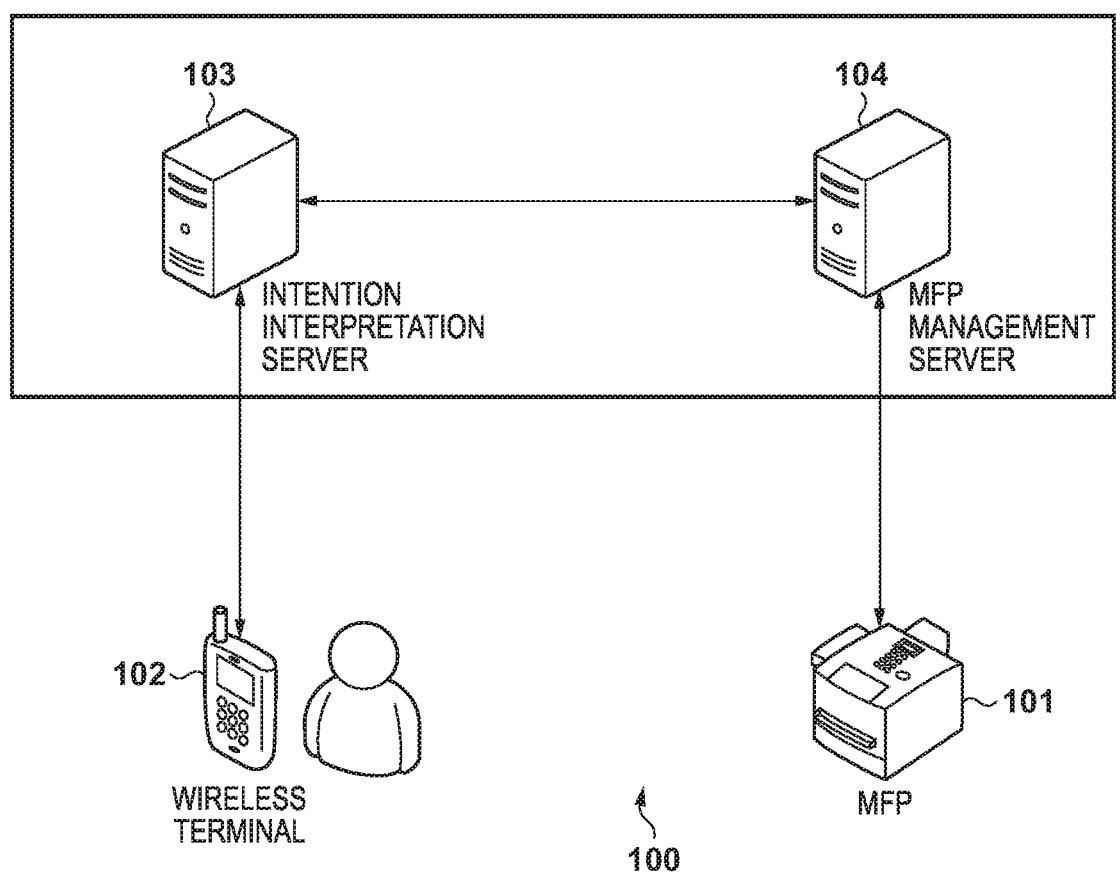
FIG. 1 is a diagram showing a configuration of an information processing system according to an embodiment.

A first embodiment of the present invention will be described below. First, a configuration of an information processing system 100 according to this embodiment will be described with reference to FIG. 1. The system according to this embodiment includes an MFP (an example of an image forming apparatus and a communication apparatus) 101, a wireless terminal (information processing apparatus) 102, an intention interpretation server 103, and an MFP management server 104. Note that at least the MFP 101 and the wireless terminal 102 have a wireless communication function, and the MFP 101 and the wireless terminal 102 can directly or indirectly connect to each other wirelessly, for example. In general, there are several modes of wireless connection, but the mode of wireless connection is not specifically limited in the present invention. For example, the mode of wireless connection may be any of short-range communication such as Wi-Fi (registered trademark), BLE, and NFC, long-distance communication such as LTE (registered trademark), 3G, and 4G, and recent IoT communication such as Cat-M1 and nb-IoT.

The MFP 101 is an example of an image forming apparatus that provides various services such as print, copy, scan, and facsimile, and has a wireless communication function. The wireless terminal 102 can wirelessly connect to the MFP 101, and is used as a controller of the MFP 101 by a user. The intention interpretation server 103 accepts user input from the wireless terminal 102 and interprets the intention of the user. The MFP management server 104 is communicably connected to the intention interpretation server 103 and the MFP 101, receives the intention of the user interpreted by the intention interpretation server 103, and transmits a command for implementing the intention to the MFP 101. Note that a plurality of image forming apparatuses such as MFPs are communicably connected to the MFP management server 104, which presents an appropriate one of the plurality of image forming apparatuses to the user via the intention interpretation server 103, in accordance with the intention of the user interpreted by the intention interpretation server 103.

The MPF 101 and the wireless terminal 102 are present in the same room in an office building, and the user makes a request for processing to the MFP 101 by operating the wireless terminal 102. Meanwhile, the intention interpretation server 103 and the MFP management server 104 may be configured to make their services public on the Internet. Note that, although this embodiment will be described while taking, as an example, the case where the user transmits a processing request to the MFP 101, a device to be set in the scope of claims is a general information processing apparatus, and the MFP 101 may also be a personal computer, a mobile terminal, or the like.

Hardware Configuration of MFP 101

Next, a hardware configuration of the MFP 101 according to this embodiment will be described with reference to FIG. 2. The MFP 101 has, as its hardware configuration, a CPU 211, a ROM (Read Only Memory) 212, a RAM (Random Access Memory) 213, a HDD (Hard Disk Drive) 214, an operation unit 215, a printer 216, a scanner 217, a Bluetooth (registered trademark) I/F 218, a Wi-Fi I/F 219, and an Ethernet (registered trademark) I/F 220. Each pieces of hardware 211 to 220 are connected by an internal bus 221 and can exchange data with each other.

The CPU 211 comprehensively controls operations of the entire MFP 101. The CPU 211 loads a control program stored in the ROM 212, the HDD 214, or the like to the RAM 213 and performs various kinds of control, such as reading control and transmission control. The RAM 213 is a volatile memory, which is used as, for example, a work area with which the CPU 211 executes various programs. The HDD 214 stores image data and various programs.

The operation unit 215 includes a display that operates as a touch panel capable of being operated with a user's finger, and hardware buttons. The printer 216 prints image data transferred via the internal bus 221 on a recording medium, such as paper. The scanner 217 reads an image on an original and generates image data. The Bluetooth I/F 218 is an interface for performing wireless communication conforming to the Bluetooth standard, and communicates with other devices that have a Bluetooth I/F. In this embodiment, the Bluetooth I/F 218 communicates with the wireless terminal 102 in conformity to the Bluetooth standard. The Wi-Fi I/F 219 and the Ethernet I/F 220 are NICs (Network Interface Cards) for connecting to a network in wireless and wired manners, respectively.

Software Configuration of MFP 101

Next, a software configuration of the MFP 101 according to this embodiment will be described with reference to FIG. 3. The MFP 101 has, as its software configuration, a network control unit 301, a UI control unit 302, an OS kernel 303, a Bluetooth communication control unit 304, a Wi-Fi communication control unit 305, and an Ethernet communication control unit 306.

The Wi-Fi communication control unit 305 is a module for controlling the Wi-Fi I/F 219. The Bluetooth communication control unit 304 is a module for controlling the Bluetooth communication I/F 218. Similarly, the Ethernet communication control unit 306 controls the Ethernet communication I/F 220. These modules are controlled by the OS kernel 303. The network control unit 301 operates the Bluetooth and Wi-Fi control units via the OS kernel 303. The network control unit 301 manages current network settings, and manages availability of respective communication modes, namely Ethernet (wired LAN), a wireless LAN, and wireless P2P connection. The network control unit 301 communicates information with the UI control unit 302 to change a display on the UI, or conversely, performs network control in response to an operation request from the UI.

Hardware Configuration of Wireless Terminal

Next, an example of a hardware configuration of the wireless terminal 102 according to this embodiment will be described with reference to FIG. 4. As shown in FIG. 4, the wireless terminal 102 has, as its hardware configuration, a system control unit 400, an operation panel 408, a speaker 409, and a microphone 410. The system control unit 400 includes a CPU 401, a ROM 402, a RAM 403, an HDD 404, an operation panel I/F 405, a speech input-output I/F 406, and a network I/F 407. These pieces of hardware 401 to 407 are connected by an internal bus 412 and can exchange data with each other.

The system control unit 400 is a control unit that comprehensively controls the wireless terminal 102. The CPU 401 comprehensively controls operations of the entire wireless terminal 102. The CPU 401 loads a control program stored in the ROM 402, the HDD 404, or the like to the RAM 403 and performs various kinds of control, such as speech input and transmission control. The RAM 403 is a volatile memory, which is used as, for example, a work area with which the CPU 401 executes various programs. The HDD 404 stores print data to be transmitted to the MFP 101, and various programs.

The operation panel I/F 405 is an interface that controls user input to the operation panel 408 and controls display output to the operation panel 408. The operation panel 408 is a user interface that is constituted by, for example, a liquid-crystal display of a touch panel type and has an input unit and a display unit. The speech input-output I/F 406 is connected to the speaker 409 and the microphone 410, and controls obtainment of a speech from the user and output of sound to the user. The network I/F 407 is connected to various networks. For example, the network I/F 407 is connected to the intention interpretation server 103 via the Internet, and is connected to the MFP 101 via wireless communication.

Hardware Configuration of Servers

Figure 5:
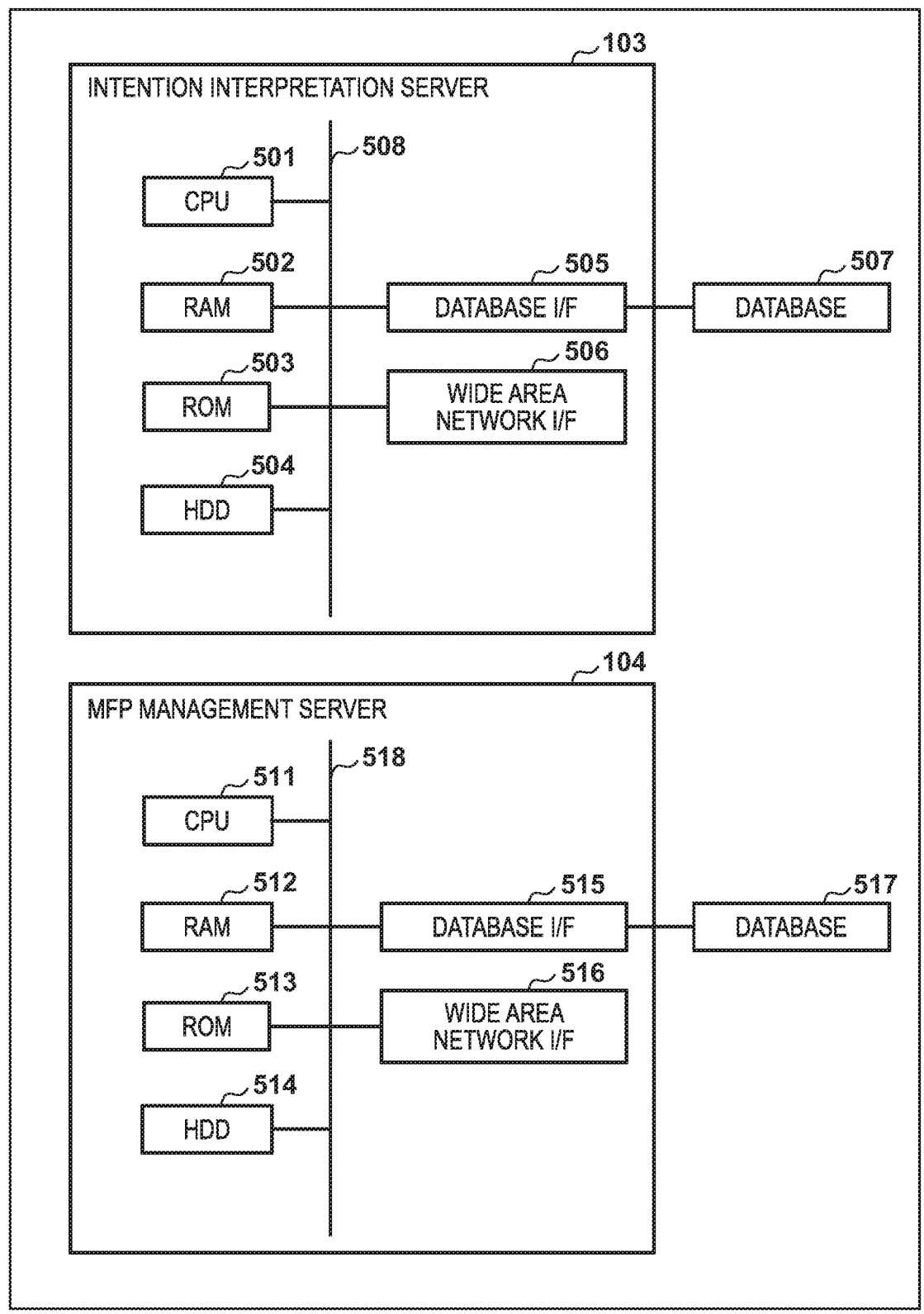
FIG. 5 is a diagram showing a hardware configuration of servers according to an embodiment.

Next, hardware configurations of the intention interpretation server 103 and the MFP management server 104 according to this embodiment will be described with reference to FIG. 5. The intention interpretation server 103 includes a CPU 501, a RAM 502, a ROM 503, an HDD 504, a database I/F 505, and a wide area network I/F 506. These pieces of hardware 501 to 506 are connected by an internal bus 508 and can exchange data with each other.

The CPU 501 comprehensively controls the intention interpretation server 103. The CPU 501 loads a control program stored in the ROM 503, the HDD 504, or the like to the RAM 502 and performs various kinds of control, such as intention analysis and transmission control. The RAM 502 is a volatile memory, which is used as, for example, a work area with which the CPU 501 executes various programs. The HDD 504 stores a later-described registered intention table and various programs.

The database I/F 505 is connected to the database (intention database) 507 and controls input and output of information to/from the database 507. The database 507 manages the later-described registered intention table shown in Table 1. The wide area network I/F 506 controls communication with the wireless terminal 102 and the MFP management server 104 via a wide area network.

The MFP management server 104 includes a CPU 511, a RAM 512, a ROM 513, an HDD 514, a database I/F 515, and a wide area network I/F 516. These pieces of hardware 511 to 516 are connected by an internal bus 518 and can exchange data with each other.

The CPU 511 comprehensively controls the MFP management server 104. The CPU 511 loads a control program stored in the ROM 513, the HDD 514, or the like to the RAM 512 and performs various kinds of control, such as intention analysis and transmission control. The RAM 512 is a volatile memory, which is used as, for example, a work area with which the CPU 511 executes various programs. The HDD 514 stores a later-described printer information table and printer capability information table, as well as various programs.

The database I/F 515 is connected to a database (printer database) 517 and controls input and output of information to/from the database 517. The database 517 manages the printer information table in Table 2 and the printer capability information table in Table 3, which will be described later. The wide area network I/F 516 controls communication with the MFP 101 and the intention interpretation server 103 via a wide area network.

Database Configuration of Intention Interpretation Server

Next, a registered intention table, which is held by the intention interpretation server 103, will be described with reference to Table 1. This table has, as auxiliary parameters for each intention, two types of parameters, namely Required parameters and optional parameters that are not the Required parameters. The Required parameter is a parameter that is required to be input, and indicates a condition that must be satisfied when each intention is interpreted. Other parameters are not required to be input, and it is desirable that conditions indicated by these parameters are satisfied when each intention is interpreted.

For example, examples of intentions include "printer selection". This is an intention to determine one printer to be used by the user, and a Color parameter, which is a parameter indicating whether or not a printer to be used supports color printing, is set as a Required parameter. Also, a Staple parameter, which is a parameter indicating whether or not an automatic stapling function is supported, is set as a parameter that is not a Required parameter.

Accordingly, if a text sentence or a speech-input sentence that is input to the intention interpretation server 103 is "use a printer capable of color printing with a stapling function", the intention of this sentence is interpreted as "printer selection". Furthermore, it is interpreted that the Color parameter is "Enable" (color printing is supported), and it is also interpreted that the Staple parameter is also "Enable" (the automatic stapling function is supported). Text sentence input that does not fall under any of the prepared intentions is interpreted as being "unknown intention". Note that, although "printer selection", "print preparation", "print", "unknown intention" are defined as intentions, and various parameters are set for these intentions in Table 1, these are examples and are not intended to limit the present invention. Other intentions and other parameters may also be registered, and these intentions and parameters may be arbitrarily added or deleted.

TABLE 1

| Intention | Required Param | Optional Param |
|---|---|---|
| Printer Selection | Color | Staple |
| Print Preparation | | |
| Print | | Size, Color |
| Unknown Intention | | |

Database Configuration of MFP Management Server

Next, a description will be given, with reference to Tables 2 and 3, the printer information table and the printer capability information table that are held by the MFP management server 104. The printer information table shown in Table 2 defines printer information, namely information regarding printers that are available for users. This information is a list of available printers associated with specific users, and it may be defined that one user can use a plurality of printers, and that one printer is available for a plurality of users. Note that Table 2 is an example and is not intended to limit the present invention. Other users or other printers may also be defined in this table.

TABLE 2

| User | Printer |
|---|---|
| X | Printer A |
| X | Printer B |
| Y | Printer A |
| Z | Printer C |

The printer capability information table shown in Table 3 defines capability information, namely information regarding capabilities of printers. Here, the Size, Color, and Staple parameters are the same as those in Table 1. "Size" indicates the largest paper size that can be printed with each printer. "Color" indicates whether or not color printing is available with each printer. If the Color parameter is "True", it indicates that color printing is available with the printer. "Staple" indicates whether or not an optional automatic stapling function is available with each printer. Note that Table 3 is an example and is not intended to limit the present invention. Other printers or other parameters may also be defined in this table.

TABLE 3

| Printer | Size | Color | Staple |
|---|---|---|---|
| Printer A | A3 | True | True |
| Printer B | A3 | True | False |
| Printer C | A4 | False | False |
| Printer D | A1 | True | False |

Processing Performed by Intention Interpretation Server 103

Figure 6:
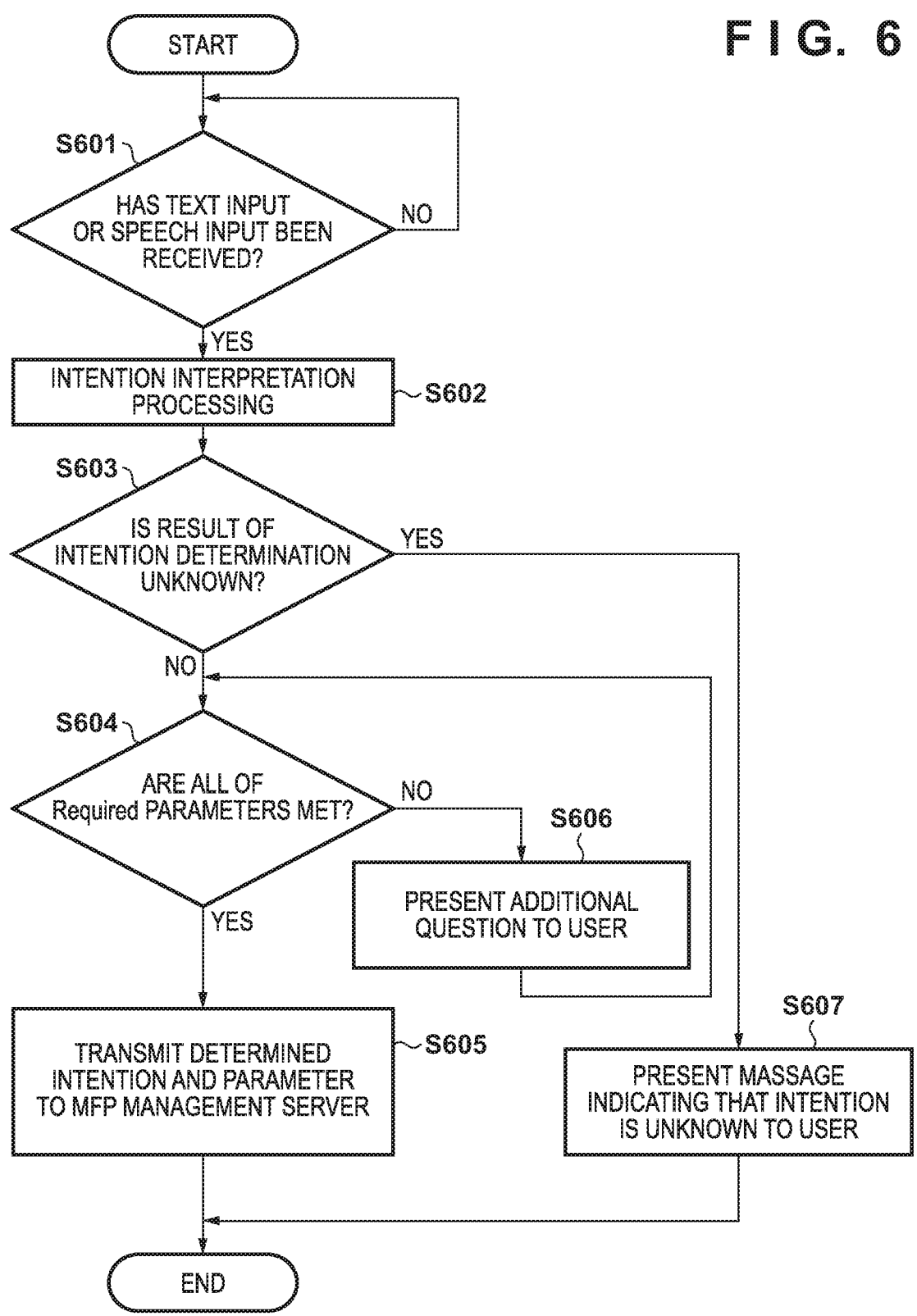
FIG. 6 is a flowchart of an intention interpretation server according to an embodiment.

Next, a description will be given, with reference to FIG. 6, a processing procedure by which the intention interpretation server 103 according to this embodiment interprets an intention of user input and transmits a signal to the MFP management server 104. Processing described below is realized by the CPU 501 of the intention interpretation server 103 loading a control program stored in the ROM 503 or the HDD 504 to the RAM 502 and executing the loaded program, for example.

In S601, the CPU 501 of the intention interpretation server 103 determines whether or not text input or speech input has been received from the wireless terminal 102. If text input or speech input has been received, the processing proceeds to S602, and the CPU 501 interprets the intention of the received input. Specifically, for speech input, the CPU 501 first performs speech recognition using a speech recognition engine and converts the input speech to a text. The CPU 501 then interprets the intention of the text converted from the text input or the speech input, using a natural language processing engine.

Next, in S603, the CPU 501 determines whether or not the result of the intention determination in S602 is unknown. The processing proceeds to S607 if unknown, and proceeds to S604 if not. In S604, for the determined intention, the CPU 501 determines whether or not all of the Required parameters shown in Table 1 are met. The processing proceeds to S606 if not all of the Required parameters are met, and proceeds to S605 if all of the Required parameters are met. In S606, the CPU 501 presents an additional question regarding a Required parameter that is not met to the user of the wireless terminal 102 via a network, and the processing returns to the determination in S604. Note that, when the processing returns to the determination in S604, new user input is received, intention interpretation processing that corresponds to S602 is performed, and parameters are extracted.

If all of the Required parameters are met, in S605, the CPU 501 transmits the determined intention and a parameter group to the MFP management server 104, and the processing ends. On the other hand, if, in S603, the result of intention determination is unknown, in S607, the CPU 501 presents a message indicating that the intention is unknown to the user of the wireless terminal 102 via the network, and the processing ends.

Processing Performed by MFP Management Server 104

Next, a description will be given, with reference to FIG. 7, of a processing procedure performed when the MFP 101 according to this embodiment receives the intention and the parameters thereof transmitted in the aforementioned S605 from the intention interpretation server 103. Processing described below is realized by the CPU 511 of the MFP management server 104 loading a control program stored in the ROM 513 or the HDD 514 to the RAM 512 and executing the loaded program, for example.

In S701, the CPU 511 of the MFP management server 104 determines whether or not a signal transmitted from the intention interpretation server 103 has been received. The processing proceeds to S702 if the signal has been received, and the CPU 511 first obtains the type of the intention included in the signal and determines whether or not the intention is "MFP determination (printer selection)". The processing proceeds to S703 if the intention is "MFP determination", and proceeds to S705 if not.

In S703, the CPU 511 determines whether or not there is any printer that is an MFP associated with the current user and meets all of the conditions (Required conditions) included in the aforementioned signal, by referencing the printer capability information table (Table 2). The processing proceeds to S709 if there is a printer that meets the conditions, and proceeds to S704 if not. In S704, the CPU 511 notifies, via the network, the intention interpretation server 103 that no matched MFP has been found, and the processing ends. On the other hand, if a printer that meets the conditions has been found, in S709, the CPU 511 generates a matched printer list and returns the list to the intention interpretation server 103, and the processing ends.

If, in S702, the intention obtained from the received signal is not "MFP determination", in S705, the CPU 511 determines whether or not an MFP that the current user account is to use has already been determined. The processing proceeds to S710 if not, and proceeds to S706 if already determined. In S710, the MFP management server 104 transmits an intention switch request to cause the intention interpretation server 103 to determine an MFP, and switches the intention to "printer selection" in Table 1, and the processing ends.

On the other hand, if the MFP to be used has already been determined, in S706, the CPU 511 determines whether or not the intention at this time requires communication with the determined MFP. The processing proceeds to S707 if required, and proceeds to S709 if not. In S707, the CPU 511 transmits a processing request corresponding to the intention of the signal to the target MFP if communication is required. Then, in S708, the CPU 511 determines whether or not a response to the transmitted processing request has been received from the MFP. The processing proceeds to S709 if a response has been received and the response indicates that the requested processing has been successfully performed, and proceeds to S711 if not. In S709, the CPU 511 transmits a signal indicating completion of the processing for the intention to the intention interpretation server 103. If, in S707, a response indicating that the requested processing has failed is received or no response is received from the MFP 101, in S711, the CPU 511 transmits a signal indicating that the processing for the intention has failed to the intention interpretation server 103, and the processing ends.

User Interface of Wireless Terminal 102

Next, the user interface displayed on the operation panel 408 of the wireless terminal 102 and a flow thereof will be described with reference to FIGS. 8A and 8B. This user interface is displayed as an interactive application screen on the operation panel 408 upon a predetermined application stored in the wireless terminal 102 being opened. The predetermined application may be installed by default in the wireless terminal 102, or may be downloaded from an external device and installed. Screens 801 to 804 shown in FIGS. 8A and 8B are screens of this application. Processing performed by the wireless terminal 102 described below is performed by the CPU 401.

The screen 801 displays past interaction history in an interaction display area 814. The interaction display area 814 shows a flow of a one-to-one interaction in time series from above. Sentences aligned on the left side indicates questions or the like given from the MFP service side, i.e. by the intention interpretation server 103, and sentences aligned on the right side indicates an utterance or text input made by the user. The questions or the like given by the intention interpretation server 103 are those presented in the aforementioned S606 and S607. If the user taps a text field 811 on the lower side of the screen 801, the CPU 401 switches the displayed screen to the screen 802 to start text input.

A virtual keyboard 822 is displayed in the lower half of the screen 802, and the user can make input in various languages. The input text content is displayed in a text field 823. If an interaction display area 821 is tapped on the screen 802, the CPU 401 returns the displayed screen to the screen 801 while maintaining the input state of the text field 823. If, in this state, a send button (icon) 813 on the screen 801 is tapped, the CPU 401 transmits, to the intention interpretation server 103, the text displayed in the text field 811 as an utterance by the user. Furthermore, the CPU 401 displays the text in an interaction display area 814.

If a speech input button (icon) 812 is tapped on the screen 801, the CPU 401 switches the displayed screen to the screen 803 to start speech input. A description that urges the user to input a speech, such as one shown in a region 832, is displayed on the screen 803, and speech input made by the user is waited for. If the user taps an interaction display area 831, or completes speech input, or taps a cancel button 833, the CPU 401 returns the display screen to the screen 801.

If a file selector button (icon) 815 is tapped on the screen 801, the CPU 401 switches the displayed screen to the screen 804 to start file selection. In the screen 804, a file that is to be printed can be selected in the lower half of the screen. If printable data (an image file, a PDF file etc.) displayed in a region 843 is tapped, the CPU 401 displays the printable data (e.g. an icon 845), which is to be transmitted, in a text field 844. In this selection, a plurality of pieces of data can be selected, and an additionally selected image is added to the right side of the text field 844. Note that, if the text field 844 is tapped in this state, the CPU 401 switches the displayed screen to the screen 802, and the user can delete the icon 845 of the displayed printable data from objects to be printed by erasing this icon using BS (backspace). If a send button 842 is tapped, the CPU 401 transmits the selected printable data to the information device that the CPU 401 is interacting with (in this case, the MFP side; directly, the intention interpretation server 103). If, while the screen 804 is displayed, an interaction display area 841 is tapped, or file selection is completed and the printable data is transmitted, the CPU 401 returns the screen to the screen 801.

Interaction Scenario

Next, an example flow of the user interacting with the MFP side via the wireless terminal 102 and using a predetermined MFP will be described with reference to FIG. 9. Processing performed by each device is comprehensively controlled by the CPU of the device.

In S901, the wireless terminal 102 transmits, to the intention interpretation server 103, user input indicating "to print". The intention interpretation server 103 performs speech recognition and language processing to interpret the intention, and it is determined than the intention is "to print" (S604). In S902, the intention interpretation server 103 transmits the intention "to print" to the MFP management server 104. Here, according to the flowchart in FIG. 7, the MFP to be used has not been determined, and thus, in S903, the MFP management server 104 transmits an intention switch request (S710) to the intention interpretation server 103.

In response, in step S904, the intention interpretation server 103 presents a question: "What is it for?" on the wireless terminal 102. In response, in S905, the wireless terminal 102 accepts user input indicating "color printing for in-house presentation", and notifies the intention interpretation server 103 of the user input. In S906, the intention interpretation server 103 performs speech recognition and language processing to interpret the intention, and transmits the interpreted intention and the parameters to the MFP management server 104 (S604). Here, data in which the intention: "printer selection"; Color (Required Param): Enabled; and Staple (Optional Param): Enable are stored is transmitted to the MFP management server 104.

Next, in S907, the MFP management server 104 generates a list in which printers that meet all of the Required parameters and also meet more Optional parameters are preferentially listed up, and returns the generated list to the intention interpretation server 103 (S708). In S908, the intention interpretation server 103 presents a list of available MFPs on the wireless terminal 102 in a form such as "available printers list [1] [2] [3]".

Thereafter, in S909, the wireless terminal 102 notifies the intention interpretation server 103 of user input indicating "use [2]", i.e. a desired image forming apparatus that is selected by the user. Subsequently, in S910, the intention interpretation server 103 performs speech recognition and language processing to interprets the intention, the intention is switched, and the intention interpretation server 103 transmits the intention "to prepare printing" to the MFP management server 104 (S604).

In S911, the MFP management server 104 issues a wireless P2P start instruction to the target MFP in accordance with the flowchart in FIG. 7 (S706). In response, the target MFP (here, the MFP 101) prepares to perform wireless P2P connection, and returns, in S912, connection information (SSID/PassPhrase) for wireless P2P connection to the MFP management server 104. In S913, this connection information is delivered from the MFP management server 104 to the wireless terminal 102 via the intention interpretation server 103. In S914, the wireless terminal 102 wirelessly connects to the MFP 101 in accordance with the delivered connection information, and ultimately submits a print job using this wireless connection.

As described above, the wireless terminal according to this embodiment accepts user input with a speech or a text, notifies the server of the accepted user input, obtains a question related to the user input from the server, and presents the obtained question to the user. Thus, the wireless terminal allows the user and the server to interact with each other. The wireless terminal receives, from the server, a list of one or more image forming apparatuses that match the intention of the user that has been interpreted by the server based on the interaction, and displays the received list. Furthermore, if a desired image forming apparatus is selected from the list by the user, the wireless terminal obtains, from the server, connection information, namely information regarding connection to this image forming apparatus, accesses the image forming apparatus, and submits a print job or the like. The management server according to this embodiment has a printer database, which holds a printer information table that defines users and one or more available image forming apparatuses in association with each other, and a printer capability information table that defines capability information regarding the image forming apparatuses. Furthermore, the management server generates a list of one or more image forming apparatuses that match the intention of the user that has been interpreted by the intention interpretation server with reference to the printer database, and provides the generated list. The intention interpretation server according to this embodiment receives user input with a speech or a text from the wireless terminal, performs speech recognition if the received user input is a speech, and performs language processing on the user input that has undergone speech recognition by a speech recognition engine or the user input with a text. Also, the intention interpretation server has an intention database that holds a plurality of intentions and one or more parameters for each of the intentions, in association with each other. Furthermore, the intention interpretation server interprets the intention of the user in accordance with the user input that has undergone language processing by the language processing engine and the information held by the intention database, and presents an additional question on the wireless terminal if the intention cannot be interpreted. Thus, according to this embodiment, the intention of the user is interactively obtained without requiring the user to perform complex operations, and a device, a function, or the like that is suitable for the intention of the user can be presented.

According to the present invention, it is possible to interactively obtain the intention of a user and present a device, a function, or the like that is suitable for the intention of the user, without requiring the user to perform a complex operation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A wireless terminal capable of communicating with an image forming apparatus and an AI (Artificial Intelligence) assistant, the wireless terminal comprising:
at least one memory storing instructions; and
at least one processor that, upon executing stored instructions, functions as
an interaction unit that accepts user input with a speech or a text, notifies the AI assistant, which interprets an intention of a user by interpreting a natural language from the user input, of the accepted user input, and allows the user and the AI assistant to interact with each other by obtaining a question related to the user input from then AI assistant and presenting the obtained question to the user;
a receiving unit that receives, from the AI assistant, a list of one or more image forming apparatuses that match an intention of the user that is interpreted by the AI assistant based on the interaction through the interaction unit; and
a display unit that displays the list received by the receiving unit, wherein
the AI assistant includes an intention interpretation server that interprets an intention of the user in accordance with a natural language interpreted from the notified user input, and a management server that manages one or more image forming apparatuses,
the intention interpretation server includes:
at least one memory storing instructions; and
at least one processor, wherein the at least one memory and the at least one processor of the intention interpretation server cooperate to function as
a speech recognition engine that performs speech recognition in a case where the user input is a speech;
a language processing engine that performs language processing on the user input that has undergone speech recognition by the speech recognition engine, or the user input with a text, to interpret a natural language from the user input;
an intention database that holds a plurality of intentions and one or more parameters for each of the intentions, in association with each other; and
an intention interpretation unit that interprets the intention of the user in accordance with the natural language interpreted by the language processing engine and information held by the intention database, and presenting an additional question on the wireless terminal in a case where there is not enough required information to respond to the intention of the user, and
the management server includes:
at least one memory storing instructions; and
at least one processor, wherein the at least one memory and the at least one processor of the management server cooperate to function as
a printer database holding a printer information table that defines a user and one or more available image forming apparatuses in association with each other, and a printer capability information table that defines capability information regarding the image forming apparatuses; and
a providing unit that generates a list of one or more image forming apparatuses that match the intention of the user interpreted by the intention interpretation server, with reference to the printer database, and providing the generated list.

2. The wireless terminal according to claim 1, wherein the at least one processor further functions as:
an obtaining unit that obtains connection information that is information regarding connection to a desired image forming apparatus selected by the user input, from the AI assistant via the list displayed on the display unit; and
a connection unit that wirelessly connects to the desired image forming apparatus and submitting a job, using the connection information obtained by the obtaining unit.

3. The wireless terminal according to claim 1, wherein the display unit further displays, in time series, the interaction between the user and the AI assistant through the interaction unit.

4. The wireless terminal according to claim 3, wherein the display unit further displays, on a screen displaying the interaction, at least one of an icon for starting speech input, a field for starting text input, an icon for starting selection of image data to be transmitted to the image forming apparatus, and an icon displaying the user input for notifying the AI assistant of the user input.

5. The wireless terminal according to claim 3, wherein the interaction between the user and the AI assistant through the interaction unit includes information related to printing.

6. The wireless terminal according to claim 5, wherein the information related to printing includes information related to a color for printing.

7. The wireless terminal according to claim 6, wherein the information related to the color for printing is a color printing setting.

8. The wireless terminal according to claim 5, wherein the information related to printing includes information related to a post-processing for printing.

9. The wireless terminal according to claim 8, wherein the information related to the post-processing is a staple setting.

10. The wireless terminal according to claim 1, wherein the parameters include a first parameter that is required to be included in the user input to interpret the user input as having a corresponding intention, and a second parameter that is an optional parameter.

11. The wireless terminal according to claim 10, wherein the intention interpretation unit presents the additional question on the wireless terminal in a case where the first parameter is not included in the user input.

12. The wireless terminal according to claim 1, wherein the providing unit checks communication with an image forming apparatus desired by the user in a case where the intention of the user interpreted by the intention interpretation server requires communication with the image forming apparatus.

13. A management server capable of communicating with an intention interpretation server that interprets an intention of a user of a wireless terminal in accordance with user input made by the user, and one or more image forming apparatuses, the management server comprising:
at least one memory storing instructions; and
at least one processor, wherein the at least one memory and the at least one processor of the management server cooperate to function as
a printer database holding a printer information table that defines a user and one or more available image forming apparatuses in association with each other, and a printer capability information table that defines capability information regarding the image forming apparatuses;
a receiving unit that receives the intention of the user interpreted by the intention interpretation server; and
a providing unit that generates a list of one or more image forming apparatuses that match the intention received by the receiving unit, with reference to the printer database, and providing the generated list,
wherein the providing unit
checks communication with a desired image forming apparatus selected via the list by the user, and
provides, in a case where the communication check is successful, connection information for connecting to the desired image forming apparatus to the wireless terminal via the intention interpretation server.

14. The management server according to claim 13, wherein
the management server determines whether or not the received intention of the user interpreted by the intention interpretation server is a determination by the image forming apparatus, and determines whether or not there is an image forming apparatus corresponding to the received intention of the user in a case where the received intention of the user is the determination by the image forming apparatus.

15. The management server according to claim 14, wherein the management server notifies the intention interpretation server that there is no image forming apparatus corresponding to the received intention of the user in a case where there is no image forming apparatus corresponding to the received intention of the user.

16. The management server according to claim 14, wherein the management server generates the list of the one or more image forming apparatuses in a case where there is an image forming apparatus corresponding to the received intention of the user.

17. The management server according to claim 13, wherein in a case where the management server accepts a selection of the image forming apparatus included in the list of the one or more image forming apparatuses via the intention interpretation server, the management server transmits an activation instruction to the selected image forming apparatus.

18. The management server according to claim 17, wherein in a case where the management server accepts information corresponding to the activation instruction from the selected image forming apparatus, the management server transmits the information to the wireless terminal via the intention interpretation server.

19. An intention interpretation server capable of communicating with a management server and a wireless terminal, the intention interpretation server comprising:

at least one memory storing instructions; and at least one processor, wherein the at least one memory and the at least one processor of the intention interpretation server cooperate to function as a receiving unit that receives user input with a speech or a text from the wireless terminal;

a speech recognition engine that performs speech recognition in a case where the user input received by the receiving unit is a speech;

a language processing engine that performs language processing on the user input that has undergone speech recognition by the speech recognition engine, or the user input with a text, to interpret a natural language from the user input;

an intention database holding a plurality of intentions and one or more parameters for each of the intentions, in association with each other; and an intention interpretation unit for interpreting an intention of a user in accordance with the natural language interpreted by the language processing engine and information held by the intention database, and presenting an additional question on the wireless terminal in a case where the intention of the user cannot be interpreted.

20. The intention interpretation server according to claim 19, wherein in a case where there is enough required information to respond to the intention of the user, the intention interpretation server transmits the interpreted intention of the user to the management server.

21. The intention interpretation server according to claim 19, wherein in a case where there is enough required information to respond to the intention of the user, the intention interpretation server transmits the required information to the management server.

22. The intention interpretation server according to claim 19, wherein in a case where the intention interpretation server cannot interpret the intention of the user, the intention interpretation server notifies the wireless terminal that the intention of the user is unknown.

23. The intention interpretation server according to claim 19, wherein the intention database includes the required information to respond to the intention of the user, and option information that is helpful when responding to the intention of the user.

24. The intention interpretation server according to claim 23, wherein the intention database includes information related to a color for printing, as the required information to respond to the intention of the user.

25. The intention interpretation server according to claim 24, wherein the information related to the color for printing is a color printing setting.

26. The intention interpretation server according to claim 23, wherein the intention database includes information related to a post-processing for printing, as the option information.

27. The intention interpretation server according to claim 26, wherein the information related to the post-processing is a staple setting.

* * * * *